United States Patent
Schneider et al.

[11] Patent Number: 5,542,292
[45] Date of Patent: Aug. 6, 1996

[54] METHOD AND DEVICE FOR MONITORING A SECONDARY-AIR SYSTEM OF A MOTOR VEHICLE

[75] Inventors: Erich Schneider, Kirchheim; Rainer Bone, Oberriexingen; Martin Klenk, Backnang; Jörg Lange, Eberdingen; Dieter-Andreas Dambach, Stuttgart, all of Germany

[73] Assignee: Robert Bosch GmbH, Stuttgart, Germany

[21] Appl. No.: 355,789

[22] Filed: Dec. 14, 1994

[30] Foreign Application Priority Data

Dec. 21, 1993 [DE] Germany ............. 43 43 639.0

[51] Int. Cl.$^6$ ............................................. F01N 3/22
[52] U.S. Cl. ............................. 73/118.1; 60/277
[58] Field of Search ................................ 73/118.1, 116, 73/117.2, 117.3, 118.2; 60/277, 289, 290

[56] References Cited

U.S. PATENT DOCUMENTS

| | | | |
|---|---|---|---|
| 3,967,929 | 7/1976 | Tamazawa et al. | 60/289 |
| 4,000,615 | 1/1977 | Bockelmann et al. | 60/277 |
| 4,026,106 | 5/1977 | Tamazawa et al. | 60/277 |
| 4,099,377 | 7/1978 | Yoshimura et al. | 60/289 |
| 4,209,981 | 7/1980 | Miyamori et al. | 60/277 |
| 4,233,811 | 11/1980 | Masaki | 60/277 |
| 4,383,408 | 5/1983 | Ujihashi et al. | 60/277 |
| 4,583,363 | 4/1986 | Urushidani et al. | 60/290 |
| 5,060,474 | 10/1991 | Aramaki | 60/277 |
| 5,113,651 | 5/1992 | Kotzan et al. | 60/277 |
| 5,119,631 | 6/1992 | Kayanuma et al. | 60/277 |
| 5,136,842 | 8/1992 | Achleitner et al. | 60/289 |
| 5,152,137 | 10/1992 | Nishizawa | 60/277 |
| 5,307,626 | 5/1994 | Maus et al. | 60/277 |
| 5,333,446 | 8/1994 | Itoh | 60/277 |
| 5,345,763 | 9/1994 | Sato | 60/290 |
| 5,355,671 | 10/1994 | Maus et al. | 60/277 |
| 5,357,752 | 10/1994 | Lucchesi | 60/289 |
| 5,381,658 | 1/1995 | Meguro | 60/277 |
| 5,388,401 | 2/1995 | Nishizawa et al. | 60/277 |
| 5,388,402 | 2/1995 | Aoki et al. | 60/289 |

FOREIGN PATENT DOCUMENTS

| | | |
|---|---|---|
| 4225361 | 2/1994 | Germany . |
| 63-143362 | 6/1988 | Japan . |

Primary Examiner—Richard Chilcot
Assistant Examiner—Eric S. McCall
Attorney, Agent, or Firm—Kenyon & Kenyon

[57] ABSTRACT

In a method and device for monitoring a secondary-air system, a first value is determined which characterizes the secondary air stream blown by the secondary-air system into the exhaust-gas channel of an internal combustion engine. On the basis of this first value, the functioning of the secondary-air system is judged. If the first value lies within a predeterminable interval, it is concluded that the secondary-air system is operating properly. If the first value, on the other hand, lies outside of this predeterminable interval, it is concluded that a malfunction is present. The first value is determined from a second value which characterizes the stream of air fed to the internal combustion engine, from the air/fuel ratio of the mixture drawn in by the internal combustion engine, and from the air/fuel ratio prevailing in the exhaust-gas channel downstream of the place of introduction of the secondary-air line.

12 Claims, 2 Drawing Sheets

5,542,292

METHOD AND DEVICE FOR MONITORING A SECONDARY-AIR SYSTEM OF A MOTOR VEHICLE

FIELD OF THE INVENTION

The present invention relates to a method and device for monitoring a secondary-air system, in combination with an exhaust-gas system, of a motor vehicle.

BACKGROUND OF THE INVENTION

A method for monitoring a secondary-air system in combination with the exhaust-gas system of a motor vehicle is described by an environmental authority in California, i.e. CARB. In the known method, the secondary-air pump is connected for a short time and the control stroke of the lambda-control circuit caused thereby is observed. If this control stroke exceeds a threshold value, it can be assumed that the secondary-air pump is supplying a sufficiently large stream of air.

SUMMARY OF THE INVENTION

The object of the present invention is to permit reliable monitoring of the injection of the secondary air.

In the method according to the present invention, the functioning of the secondary-air system is judged on the basis of a signal for the secondary air stream. One advantage of the present invention is that an additional sensor is not required in order to produce the signal for the secondary air stream, since the signals required for this are either present or they can be formed from signals which are available. The signals required are a signal for the intake-air stream, a signal for the air/fuel ratio of the mixture drawn in by the internal combustion engine, and a signal for the air/fuel ratio downstream of the entrance of a secondary-air line into the exhaust-gas channel.

In order to judge the functioning of the secondary-air system, it is determined whether the secondary air stream lies within a permissible interval, which can be predetermined as a function of the condition of operation of the internal combustion engine. This has the advantage that the judgment can be made under any operating condition. Thus, the judgment can be made, in particular, when the secondary-air pump is operating. In this way, the frequency at which the secondary-air pump is turned on is reduced, leading to a longer pump life. Furthermore, unnecessary worsening of the exhaust gas is avoided.

Another advantage of the method according to the present invention is that it can be used both with lambda-control connected and with lambda-control disconnected.

DETAILED DESCRIPTION

In order to bring the catalyst in the exhaust-gas channel of an internal combustion engine to operating temperature as rapidly as possible, fresh air can be blown into the exhaust-gas channel between the internal combustion engine and the catalytic convertor. Due to the exothermal reaction between the exhaust gas and the fresh air injected, there is an accelerated heating of the catalytic convertor in the exhaust-gas channel and/or in the catalytic converter.

For the smallest possible emission of pollutants, it is desirable to heat the catalytic converter to its operating temperature as rapidly as possible. It is therefore important for the secondary-air system which blows the fresh air into the exhaust-gas channel to be operating properly. In the present invention, the functioning of the secondary-air system is judged on the basis of the air mass stream produced by the secondary-air system, referred to hereinbelow as the secondary air stream. For reasons of expense, however, a sensor for the detection of the secondary air stream is dispensed with. Instead, the secondary air stream is determined from known values.

Figure 1:
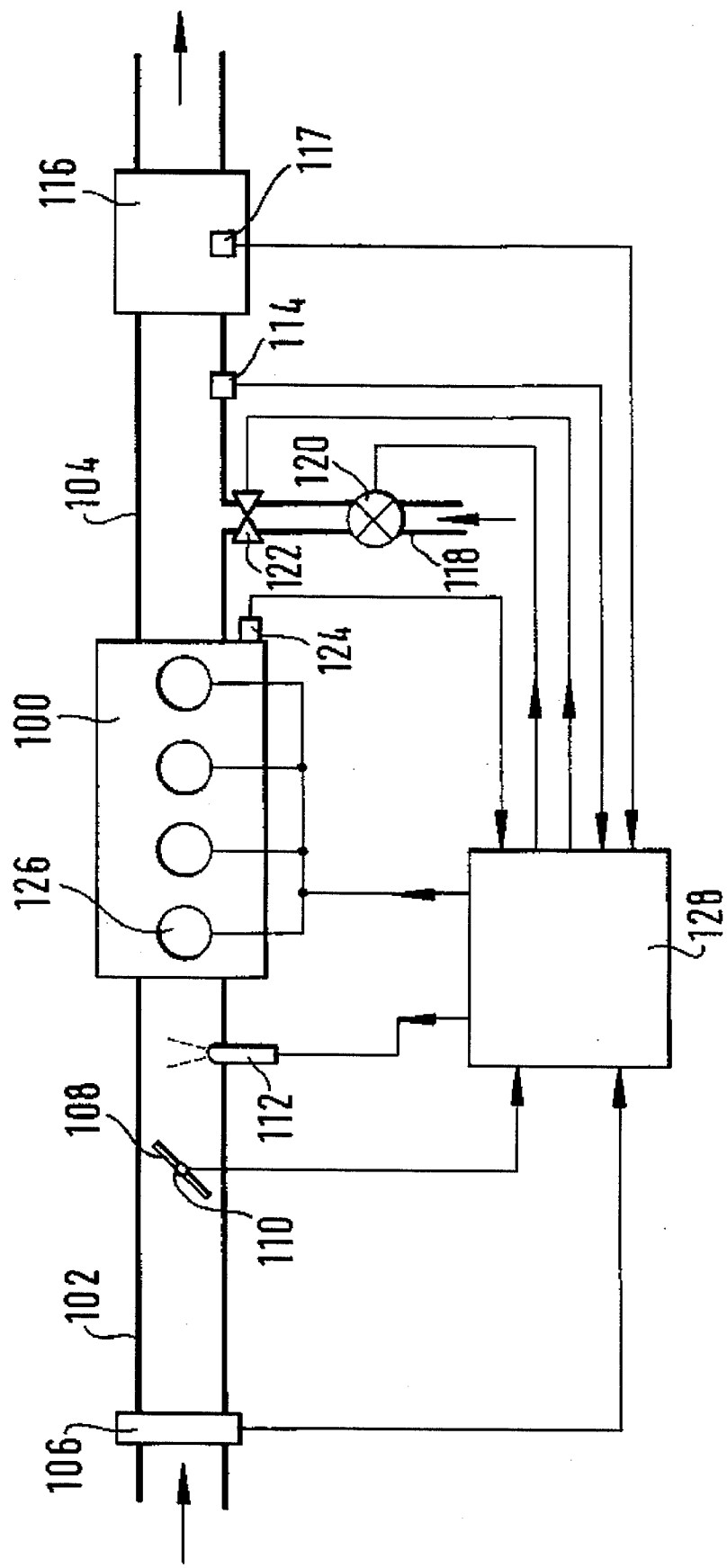
FIG. 1 diagrammatically shows an internal combustion engine having a secondary-air system which is monitored by the method according to the present invention.

The procedure used to implement this method is explained below:

FIG. 1 shows an internal combustion engine 100 which is provided with a secondary-air system. An air/fuel mixture is fed to the internal combustion engine 100 via an intake line 102, and the exhaust gases are discharged into an exhaust-gas channel 104. Within the intake line 102 there are present—seen in the direction of flow of the air drawn in—an air volume meter or air mass meter 106, for instance, a hot-film air-mass meter, a throttle valve 108 having a sensor 110 for detecting the angle of opening of the throttle valve 108 and at least one injection nozzle 112. Within the exhaust-gas channel 104 there are present—seen in the direction of flow of the exhaust gas—an oxygen sensor 114 and a catalytic converter 116 having a temperature sensor 117. Upstream of the oxygen sensor 114, a secondary-air line 118 debouches into the exhaust-gas channel 104. Fresh air can be blown into the exhaust-gas channel 104 through the secondary-air line 118 by means of a secondary air pump 120. Between the secondary air pump 120 and the point of introduction of the secondary-air line 118 into the exhaust-gas channel 104 there is a valve 122. The valve 122 is necessary, for instance, in order to seal the exhaust-gas channel 104 off when the secondary air pump 120 is disconnected. The valve 122 can furthermore be used to control the stream of secondary air.

A speed-of-rotation sensor 124 is arranged on the internal combustion engine 100. The internal combustion engine 100 also has, for example, four spark plugs 126 for igniting the air/fuel mixture in the cylinders. The output signals of the air volume meter or air mass meter 106, of the sensor 110 for detecting the angle of opening of the throttle valve 108, of the oxygen sensor 114, of the temperature sensor 117, and of the speed-of-rotation sensor 124 are fed to a central control unit 128 over corresponding connecting lines. The central control unit 128 evaluates the sensor signals and, over further connecting lines, controls the injection nozzle or nozzles 112, the secondary air pump 120, the valve 122, and the spark plugs 126.

Figure 2:
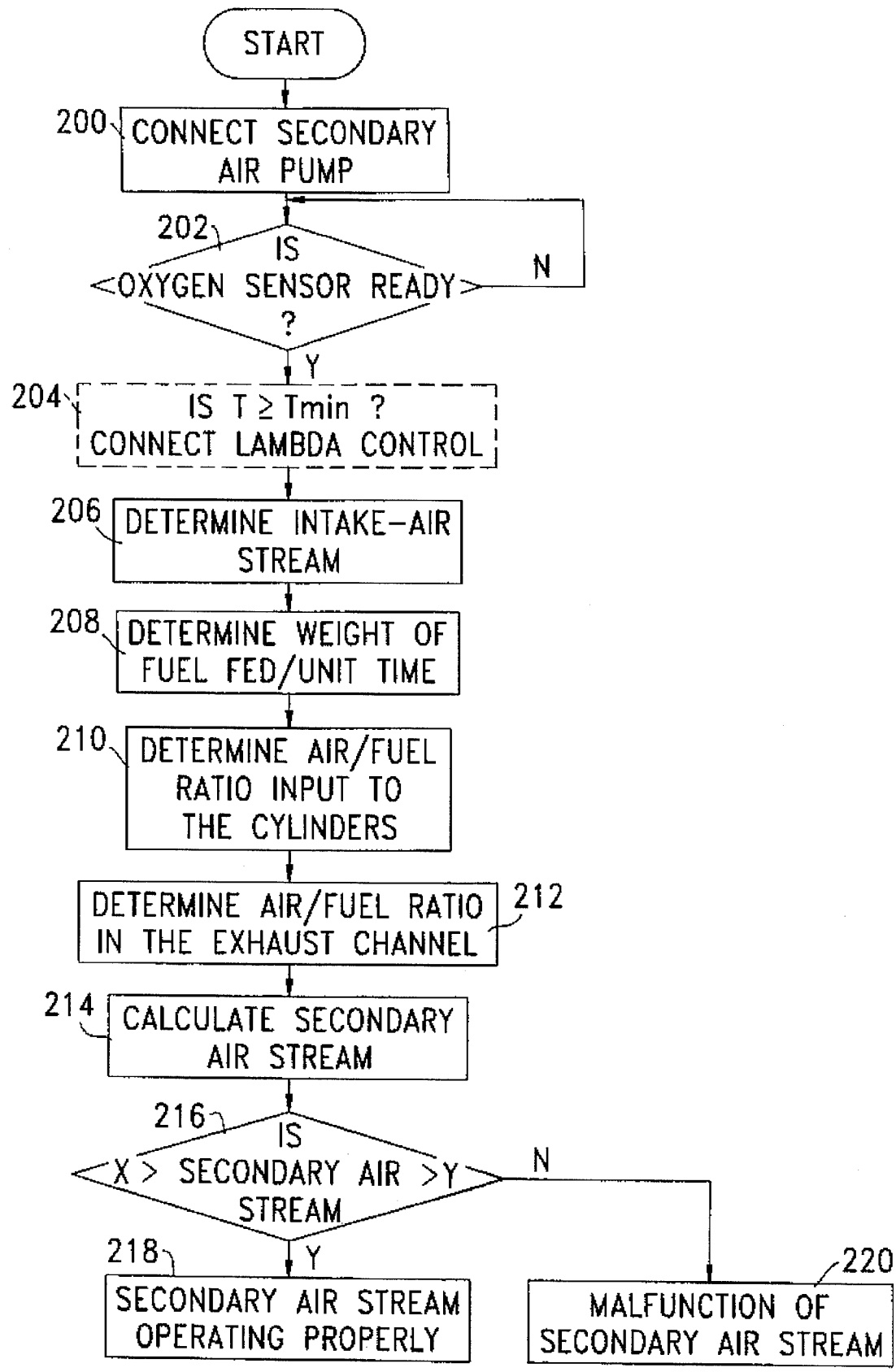
FIG. 2 shows a flow chart of the method according to the present invention.

FIG. 2 is a flow chart of the method according to the present invention. In a first step 200, the secondary air pump 120 is connected and the valve 122 is opened. Step 200 is, as a rule, carried out immediately upon the starting of the internal combustion engine 100, or shortly thereafter, in order to heat the catalytic converter 116 as rapidly as possible to its operating temperature and/or to reduce the proportion of pollutants in the exhaust gas during the warming-up phase of the internal combustion engine 100. Step 200 is followed by a step 202, in which it is inquired whether the oxygen sensor 114 is ready to operate. Step 202 is carried out until this question is answered in the affirmative. When the question in step 202 has been affirmatively answered, i.e. the oxygen sensor 114 is ready to operate, a step 204 takes place. The step 204 is shown in dashed line, since it is not used in another embodiment which will be described below. In step 204, one waits until a predeterminable condition has been satisfied, whereupon the lambda control is connected. By the lambda control, the air number is brought to a value of 1 or some other suitable value. The predeterminable condition is, as a rule, such that the lambda-control is only connected when the catalytic converter 116 has at least partially reached its minimum operating temperature. The condition is, as a rule, formulated in the manner that it is asked whether a threshold value for a variable relating to the temperature of the catalytic converter has been exceeded. Such variables include the temperature of the catalytic converter 116, which is either detected by the sensor 117 or determined with the use of a model, the volume or mass of air drawn in since the starting of the internal combustion engine 100, the amount of fuel injected since the starting of the internal combustion engine 100, assuming that a stoichiometric air/fuel ratio is present, the number of rotations of the crankshaft since the starting of the internal combustion engine 100, the time which has passed since the starting of the internal combustion engine 100, the exhaust gas temperature, the temperature of the internal combustion engine 100, etc.

However, the condition can also be formulated in the manner that the lambda-control is already connected when the catalytic converter has not yet reached its minimum operating temperature. It is furthermore possible to formulate the condition in such a manner that it is always satisfied, i.e. the lambda-control is connected immediately.

Step 204 is followed by a step 206. In step 206, the intake air stream is determined, i.e. the air-mass flow or air-volume flow in the intake line 102. The intake air stream can, for instance, be determined from the output signal of an air-mass meter or air-volume meter 106, or from a load signal and the speed of rotation. The load signal can, in turn, be derived from the angle of the throttle valve, from the pressure downstream of the throttle valve 108, or from other suitable signals. Step 206 is followed by a step 208, in which the weight of fuel fed per unit of time is determined. This can be effected, for instance, with the aid of the family of precontrol characteristic curves for the lambda-control, the control stroke of the lambda-control, and the speed of rotation. As an alternative to this, the mass of fuel fed per unit of time can be determined from the injection time and the speed of rotation.

Step 208 is followed by a step 210. In step 210, the air/fuel ratio of the mixture drawn in by the internal combustion engine 100 is determined. For this purpose, the stream of intake air is divided by the weight of fuel fed per unit of time. If the air/fuel ratio is expressed as air number, it is furthermore divided by 14.7 which is the stoichiometric air/fuel ratio.

Step 210 is followed by a step 212, in which the air/fuel ratio in the exhaust-gas channel 104 downstream of the mouth of the secondary air line 118 is determined. The exact manner of procedure depends in this connection on the embodiment of the oxygen sensor 114 and is well-known to the person skilled in the art. For example, the voltage given off by the oxygen sensor 114 can be detected and the air/fuel ratio determined therefrom.

Step 212 is followed by a step 214, in which the secondary air stream is calculated from the values determined in steps 206, 210 and 212. In this connection, the air/fuel ratio in the exhaust-gas channel 104 which has been determined in step 212 is divided by the air/fuel ratio in the intake line 102 which has been determined in step 210 and 1 is subtracted from the result of the division. By multiplication with the intake air stream, the secondary air stream is finally obtained.

Step 214 is followed by a step 216. In step 216, the functioning of the secondary-air system is judged on the basis of the secondary air stream determined in step 214. For this purpose, it is tested whether the secondary air stream lies within a determinable interval. If so, then step 216 is followed by a step 218, in which it is concluded that the secondary air stream is operating properly. If the question asked in step 216, on the other hand, is not answered affirmatively, there then follows step 220, in which it is determined that a malfunction is present. If possible, suitable measures for eliminating the malfunction are taken in step 220. Furthermore, the malfunction can be entered into a malfunction storage and the malfunction can be optically or acoustically indicated. With both step 218 and with step 220 the course of the flow chart has been completed.

A particularly dependable monitoring of the secondary-air system can be obtained in the manner that the interval of the secondary-air system which can be determined for step 216 is determinable as a function of the condition of operation of the internal combustion engine 100. In this way, the fact can be taken into account that, even if the secondary air stream is functioning properly, the secondary air stream can vary depending on the condition of operation of the internal combustion engine 100. If, for instance, a very high exhaust-gas back pressure prevails, a smaller secondary air stream is established than with a small exhaust back pressure.

The embodiment mentioned above in which step 204 of the flow chart is dispensed with, refers to a case of use in which the function testing of the secondary-air system is carried out with the lambda-control disconnected, i.e. in controlled operation. This embodiment can, for instance, be used when a secondary-air pump of very high performance is present. It may then happen that a lambda-control is not possible with the secondary-air pump connected, since the maximum controller stroke of the lambda-control is not sufficient to establish the desired air/fuel ratio. In this case, adjustment to the desired air/fuel ratio may possibly not even be desired, since this would have the result that the internal combustion engine 100 is operated with a very rich air/fuel mixture.

Another reason for controlled operation can be that the internal combustion engine 100 is to be operated in the warming-up phase with an air/fuel mixture which cannot be regulated with the existing lambda probe. This is true, for instance, when using an oxygen sensor 114 the output voltage of which changes suddenly upon an air number of 1 and at the same time the desired air number differs clearly from 1.

If, therefore, the lambda-control cannot be connected for any reason, the method of the invention can nevertheless be used, in which case step 204 is dispensed with. Furthermore, in order then to determine the air/fuel ratio in the exhaust-gas channel 104 with the secondary-air pump 120 connected in accordance with step 212, there is the possibility of shifting the lambda prior control over a ramp until a jump takes place in the output signal in the case of an oxygen sensor 114 having a stepwise characteristic curve. In other words, in this case, the air/fuel ratio required for the method of the invention is determined downstream of the place of introduction of the secondary-air line 118 into the exhaust-gas channel 104 by means of an oxygen sensor 114 the output signal of which changes abruptly approximately at an air number of 1. The air/fuel ratio of the mixture drawn in by the internal combustion engine 100 is determined, in this case, simultaneously with the occurrence of the jump from the intake-air stream, the precontrol values of the lambda precontrol, and the speed of rotation.

In all embodiments, the signal for the intake-air stream and/or the signal for the air/fuel ratio of the mixture drawn in by the internal combustion engine 100 and/or the signal for the air/fuel ratio can be determined downstream of the place of introduction of a secondary air line 118 into the exhaust-gas channel 104, etc., over a predeterminable time interval.

What is claimed is:

1. A method of monitoring a secondary-air system of a motor vehicle, comprising the steps of:
   determining a secondary-air stream signal as a function of:
   an intake-air stream signal, the intake-air stream being one of an air-volume stream and an air-mass stream drawn in by an internal combustion engine,
   a calculated ratio signal determined by a calculated ratio of a rate of the intake-air stream to a fuel feed rate, and
   an air/fuel ratio signal determined by a sensor situated downstream of a place of introduction of a secondary-air line into an exhaust-gas channel;
   judging a functioning of the secondary-air system as a function of the secondary-air stream signal;
   disconnecting a lambda control during controlled operation; and
   checking an operability of the secondary-air system when the lambda control is disconnected during controlled operation.

2. The method according to claim 1, wherein the secondary-air system is considered operable when the secondary-air stream signal falls within a predetermined interval, and is considered inoperable when the secondary-air stream signal falls outside the predetermined interval, the predetermined interval being a function of a condition of operation of the internal combustion engine.

3. The method according to claim 1, further comprising the step of:
   determining the secondary-air stream signal by multiplying a difference of a quotient from the air/fuel ratio downstream of the place of introduction of the secondary-air line into the exhaust-gas channel and the calculated ratio of the intake-air stream to the fuel feed rate from a value of 1, by the intake-air stream.

4. The method according to claim 1, wherein the intake-air stream signal is generated by one of an air-mass meter and an air-volume meter.

5. The method according to claim 1, wherein the intake-air stream signal is determined as a further function of a load signal and a speed of rotation signal.

6. The method according to claim 1, further comprising the step of:
   averaging over a predetermined time period at least one of:
   the intake-air stream signal, the calculated ratio signal, and the air/fuel ratio signal.

7. The method according to claim 1, further comprising the steps of:
   operating a secondary-air pump situated in the secondary air-line;
   checking an operability of the secondary air system when the secondary-air pump is operating.

8. The method according to claim 7, wherein the operability of the secondary-air system is checked during a warming-up phase of the internal combustion engine.

9. The method according to claim 1, further comprising the step of:
   checking an operability of the secondary-air system with a sensor to determine the air/fuel ratio.

10. The method according to claim 1, further comprising the steps of:
    upon determining a satisfaction of a condition with respect to at least one of:
    a measure of time since a starting of the internal combustion engine,
    a measured temperature of a catalytic converter,
    a temperature determined using a model,
    a mass of air integrated since the starting of the internal combustion engine,
    a mass of fuel injected since the starting of the internal combustion engine, and
    a number of crankshaft revolutions since the starting of the internal combustion engine:
    connecting a lambda-control; and
    checking an operability of the secondary-air system.

11. The method according to claim 1, wherein an output signal of the sensor changes abruptly approximately at an air number of 1.

12. The method according to claim 11, further comprising the step of:
    determining the air/fuel ratio drawn in by the internal combustion engine simultaneously with an abrupt change in the output signal of the sensor from:
    the intake-air stream,
    a pre-control value of a lambda pre-control, and
    a speed of rotation of the internal combustion engine.

* * * * *